(12) United States Patent
Neundorfer et al.

(10) Patent No.: US 8,907,582 B2
(45) Date of Patent: Dec. 9, 2014

(54) KICKSTART FOR DIMMERS DRIVING SLOW STARTING OR NO STARTING LAMPS

(75) Inventors: Oscar Lewis Neundorfer, Senoia, GA (US); Carlos Eduardo Restrepo, Atlanta, GA (US); Rohit Sumerchand Dodal, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 177 days.

(21) Appl. No.: 13/596,738

(22) Filed: Aug. 28, 2012

(65) Prior Publication Data

US 2014/0062330 A1 Mar. 6, 2014

(51) Int. Cl.
*H05B 37/02* (2006.01)
(52) U.S. Cl.
USPC ............................................ 315/224; 315/193
(58) Field of Classification Search
None
See application file for complete search history.

(56) References Cited

U.S. PATENT DOCUMENTS

| | | | | |
|---|---|---|---|---|
| 5,043,635 A * | 8/1991 | Talbott et al. | ................. | 315/291 |
| 7,202,611 B2 * | 4/2007 | Matsuura | ...................... | 315/291 |
| 2006/0279228 A1 * | 12/2006 | Kato | .............................. | 315/193 |
| 2007/0040516 A1 * | 2/2007 | Chen | ............................. | 315/291 |
| 2009/0295298 A1 * | 12/2009 | Chen et al. | ................ | 315/185 R |

\* cited by examiner

*Primary Examiner* — Crystal L Hammond
(74) *Attorney, Agent, or Firm* — King & Spalding LLP (57) ABSTRACT

A method for providing a kickstart pulse to a dimmer circuit for a light source that is slow starting. The method includes receiving an initial power signal for a light source electrically coupled to a dimmer circuit, and generating, using the initial power signal, a pulse signal. The method also includes sending, for a period of time, the pulse signal to a load control circuit for the light source. In such a case, the light source is illuminated by the pulse signal for the period of time, and the magnitude of the pulse signal is greater than the magnitude of a steady-state signal generated by the dimmer circuit for the light source. The method can be performed using discrete components, integrated circuits, software, some other electrical device, or any combination thereof. A kickstart circuit and a dimmer circuit, using substantially the method described above, is also disclosed herein.

20 Claims, 6 Drawing Sheets

KICKSTART FOR DIMMERS DRIVING SLOW STARTING OR NO STARTING LAMPS

TECHNICAL FIELD

The present invention relates generally to dimming circuits, and more particularly to providing a kickstart for dimmers driving slow starting or no starting lamps.

BACKGROUND

Dimming circuits are used to control the amount of current and/or voltage supplied to a light source. At times, when the setting of a dimmer switch is low and initial power is being fed to the light source to turn on the light source, the light source will not light until a significant time delay (from a number of seconds to minutes) has passed. In some cases, the light source will not illuminate at all in such a case. As dimmer levels are increased when the initial power is fed to the light source, the issue associated with time delays or the inability for the light source to illuminate are less problematic.

SUMMARY

In general, in one aspect, the disclosure relates to a method for providing a kickstart pulse to a dimmer circuit. The method can include receiving an initial power signal for a light source electrically coupled to a dimmer circuit. The method can also include generating, using the initial power signal, a pulse signal. The method can further include sending, for a period of time, the pulse signal to a load control circuit for the light source. The light source can be illuminated by the pulse signal for the period of time. The pulse signal can have a first magnitude, where the first magnitude of the pulse signal is greater than a second magnitude of a steady-state signal generated by the dimmer circuit for the light source.

In another aspect, the disclosure can generally relate to a kickstart circuit for a light source with a dimmer. The kickstart circuit can include a power supply that includes a number of first components that receive the initial power signal and generate, using the initial power signal, a processed signal. The kickstart circuit can also include a pulse generator electrically coupled to the power supply, where the pulse generator includes a number of components configured to receive the processed signal and generate, using the processed signal, a pulse signal. The components of the pulse generator can also be configured to send the pulse signal to a load control circuit of a dimmer circuit for the light source.

In yet another aspect, the disclosure can generally relate to a dimmer circuit having a dimming network, a load control circuit, and a kickstart circuit. The dimming network can receive a power signal from a power source, and generate a steady-state signal, where the dimming network is electrically coupled to a light source. The load control circuit can be electrically coupled to an output of the dimming network and to the light source. The kickstart circuit can be electrically coupled to the load control circuit, where the kickstart circuit provides a pulse signal for a period of time to the load control circuit. The load control circuit can use the pulse signal to illuminate the light source during the period of time. Also, the load control circuit can use the steady-state signal generated by the dimmer circuit to illuminate the light source after the period of time.

In still another aspect, the disclosure can generally relate to a computer readable medium comprising computer readable program code embodied therein for performing a method for controlling a lighting device. The method can include receiving an initial power signal for a light source electrically coupled to a dimmer circuit. The method can also include generating, using the initial power signal, a pulse signal. The method can further include sending, for a period of time, the pulse signal to a load control circuit for the light source. The light source can be illuminated by the pulse signal for the period of time. The pulse signal can have a first magnitude, where the first magnitude of the pulse signal is greater than a second magnitude of a steady-state signal generated by the dimmer circuit for the light source.

These and other aspects, objects, features, and embodiments will be apparent from the following description and the appended claims.

BRIEF DESCRIPTION OF THE DRAWINGS

The drawings illustrate only exemplary embodiments of kickstarting slow starting light sources coupled to a dimmer and are therefore not to be considered limiting of its scope, as kickstarting slow starting light sources coupled to a dimmer may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Exemplary embodiments of kickstarting slow starting or no starting light sources coupled to a dimmer will now be described in detail with reference to the accompanying figures. Like elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description.

Kickstart, as defined herein, is a term used to describe a pulse that is generated and delivered upon an initiating event (e.g., receiving an initial voltage signal). The pulse is then generated and delivered for a period of time, after which time the pulse is no longer generated or delivered. The pulse has a magnitude that is higher than that of a steady-state signal, and so the pulse is introduced to a light source before the steady-state signal so that the light source can be immediately illuminated by the steady-state signal when the pulse has ended. Without the kickstart (the pulse), the steady-state signal may be too weak (have too low of a magnitude) to illuminate the light source at an appropriate level (based on a dimmer setting) without a delay of one or more minutes, if the light even illuminates at all.

Any transistor (e.g., transistor 406, transistor 440 in FIG. 4 below) described herein can be one or more of a number of different type, size, and/or kind of transistor. For example, a transistor can be a general purpose transistor (e.g., n-p-n bipolar junction transistor). In another example, a transistor can be a high power, high voltage transistor. A transistor can be any type of transistor, including but not limited to n-p-n and p-n-p junction transistors. Further, a transistor can be any kind of transistor, including but not limited to a field-effect transistor, a metal-oxide-semiconductor field-effect transistor (MOSFET), a power MOSFET, and an insulated gate bipolar transistor.

In addition, the values and/or type of any other components (e.g., resistors, capacitors, diodes, triodes for alternating current (triacs), diodes for alternating current (diacs), optocouplers) shown in the figures below can vary, depending on one or more of a number of other factors. Examples of such other factors can include, but are not limited to, the size, value, and type of a corresponding component to which the component is electrically coupled and a desired current and/or voltage level associated with the component. One or more components shown in the following figures can be substituted with one or more other components and/or software.

A user may be any person that interacts with one or more components of a lighting system having dimming capability (e.g., a dimmer switch, a light source). Examples of a user may include, but are not limited to, homeowner, a business person, an engineer, an electrician, an instrumentation and controls technician, a mechanic, an operator, a consultant, a contractor, and a manufacturer's representative.

A power signal, an initial power signal, a steady-state power signal, a pulse signal, an initial signal, a steady-state signal, or any other type of signal described herein can be a periodic and/or cyclical electrical signal. Such an electrical signal can include a voltage and/or current having any of a number of voltage values (e.g., 120 V alternating current (AC), 240 VAC, 24 V direct current (DC), 12 VDC) and/or current values. Such an electrical signal can operate on one or more of a number of frequencies, including but not limited to 60 Hz and 50 Hz. In certain exemplary embodiments, a lighting system (or one or more components thereof) can operate on different voltages, currents, and/or frequencies based on one or more of a number of conditions, including but not limited to hardware settings, software programming, the position of a variable resistor, and the setting of a switch associated with the light fixture.

Figure 1:
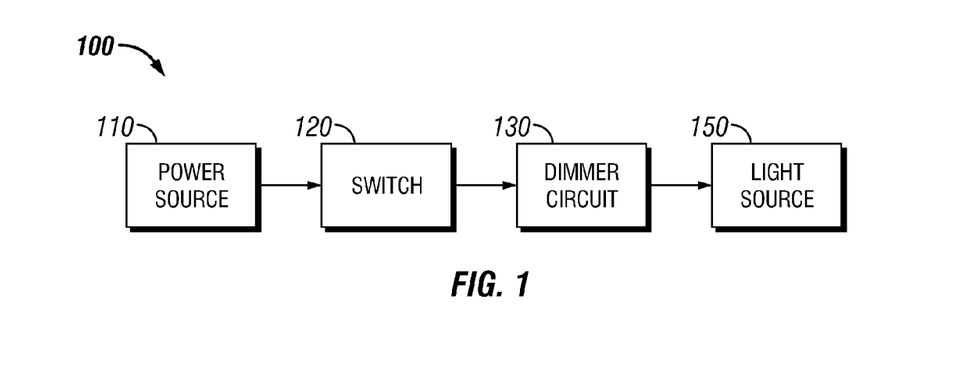
FIG. 1 illustrates a block diagram of a lighting system that includes a dimmer circuit.

FIG. 1 illustrates a block diagram of a lighting system 100 that includes a dimmer circuit 130. Specifically, the lighting system 100 includes power source 110, a switch 120, the dimmer circuit 130, and a light source 150. Each of these components is described below. Exemplary embodiments are not limited to the configuration shown in FIG. 1 and discussed herein.

Referring to FIG. 1, the exemplary power source 110 is one or more sources of energy (e.g., electricity) used to provide power and/or control to the dimmer circuit 130, light source 150, and/or one or more other applicable components of the lighting system 100. The power source 110 typically provides electricity that is in AC format and/or DC format. The power source 110 may be physically separate from the other components of the lighting system 100 (as with 120 VAC household wiring that is connected to the switch 120) and/or internal within a component of the lighting system 100.

The amount of voltage delivered by the power source 110 to the switch 120 may be any amount suitable to operate the elements of the switch 120, the dimmer circuit 130, and/or the light source 150. In certain exemplary embodiments, the voltage delivered by the power source 110 is transformed, rectified, inverted, and/or otherwise manipulated, at the power source 110 and/or within another component (e.g., the dimmer circuit 130) of the lighting system 100, so that the various components of the lighting system 100 receive a proper voltage level to operate properly.

In certain exemplary embodiments, the power source 110 is interruptible. For example, an "on/off" switch (not shown) may be integrated with, or operatively coupled to, the power source 110. Such an "on/off" switch can be used to allow and prevent power from flowing to the switch 120 and other components of the lighting system 100. The "on/off" switch can be operated by a user, by a sensing device (e.g., a motion sensor), by a timer, by the occurrence of some condition (e.g., the passage of time), by some other factor, or any combination thereof. The "on/off" switch may be integrated with, or separate from, the switch 120.

When such an "on/off" switch is turned on, power (also called an initial power signal) begins to flow to the switch 120 and the remaining components of the lighting system 100. As the power signal (starting with the initial power signal) continues to flow, the continuing power signal can be called a steady-state power signal. The duration of the initial power signal (before becoming the steady-state power signal) can be for a period of time.

In certain exemplary embodiments, the switch 120 is a dimmer switch. The switch 120 can be a single pole switch, a three-pole switch, or a switch with any other number of poles. The switch 120 is a manually adjustable mechanism that allows a user to manually adjust, directly or indirectly, a setting. In this case, the setting is an amount of light output by the light source 150. The switch 120 can be mounted on one or more of a number of surfaces (e.g., a wall, a ceiling, a frame). The switch 120 can also be disposed on a housing for the dimmer circuit 130 and/or the light source 150.

The switch 120 can be one of any type of dimming switch. The switch 120 can allow adjustments to be made using a dial, a switch, a sliding knob, a touchscreen, or any other suitable interface. The signal to provide the dimming adjustment may be through a direct electrical connection or by wireless communication to the dimmer circuit 130. In certain exemplary embodiments, the switch 120 sends a dimmer setting to the dimmer circuit 130. The switch 120 can be a physical device, a circuit that includes one or more of a number of discrete components (e.g., resistor, diode, capacitor), an integrated circuit, software (as executed by a hardware processor, for example), or any suitable combination thereof.

The switch 120 may be a current source dimming switch or a current sink dimming switch. The current source dimming switch has no source of power, and so needs an external source of power to operate. By contrast, a current sink dimming switch has an output voltage and requires no external source of power to operate. Exemplary embodiments described herein may be used with either a current source dimming switch or a current sink dimming switch.

When the initial power signal begins to flow through the switch 120 from the power source 110 (as when an "on/off"

switch is turned on), the amount of power that is sent to the light source 150 is determined by the setting of the switch 120. For example, if the dimmer setting is approximately at the 10% level, then the initial power signal that is generated by the dimming network (defined below) of the dimmer circuit 130 is reduced by 90% before being sent to the light source 150. Likewise, the steady-state power signal is also reduced by 90% before being sent to the light source 150 if the dimmer setting is unchanged.

In certain exemplary embodiments, the dimmer circuit 130 is one of a number of circuits that adjusts the amount of output (e.g., voltage, current) that is sent to the light source 150 based on the position of the switch 120 as selected by the user. The output of the dimmer circuit 130 is of an appropriate amount (e.g., amount of voltage, amount of current) and of an appropriate type (e.g., alternating current, direct current) that is suitable for proper operation of the light source 150. For example, the switch 120 can be a 0-10 V direct current (DC) dimming switch.

The dimmer circuit 130 is operatively coupled to the switch 120 and the light source 150. The dimmer circuit 130 can be located within a housing for the switch 120 and/or the light source 150. Alternatively, the dimmer circuit 130 can be located remotely from the switch 120 and/or the light source 150. The dimmer circuit 130 can be a physical device, a circuit that includes one or more of a number of discrete components (e.g., resistor, capacitor), an integrated circuit, software (as executed by a hardware processor, for example), or any suitable combination thereof. An exemplary dimmer circuit 130 having a kickstart circuit 210 (FIG. 2) is described in more detail below with respect to FIG. 2.

The light source 150 can be any source of illumination that is powered by electricity and uses one or more of a number of lighting technologies. Examples of a lighting technology include, but are not limited to, light-emitting diode (LED), compact fluorescent, halogen, sodium vapor, mercury vapor, metal halide, high-pressure sodium, tungsten-halogen, and linear fluorescent. A light source can be used in any type of application, whether indoors or outdoors.

In certain exemplary embodiments, the light source 150 includes one or more components that limit or control the power used by the light source 150. Examples of such a component includes a ballast (not shown) and/or a driver (not shown). These components can be a physical device, a circuit that includes one or more of a number of discrete components (e.g., resistor, inductor, diode, capacitor), an integrated circuit, software (as executed by a hardware processor, for example), or any suitable combination thereof. Such a component can be located within the same housing as the light source 150, or such a component can be remotely located from the light source 150.

Figure 2:
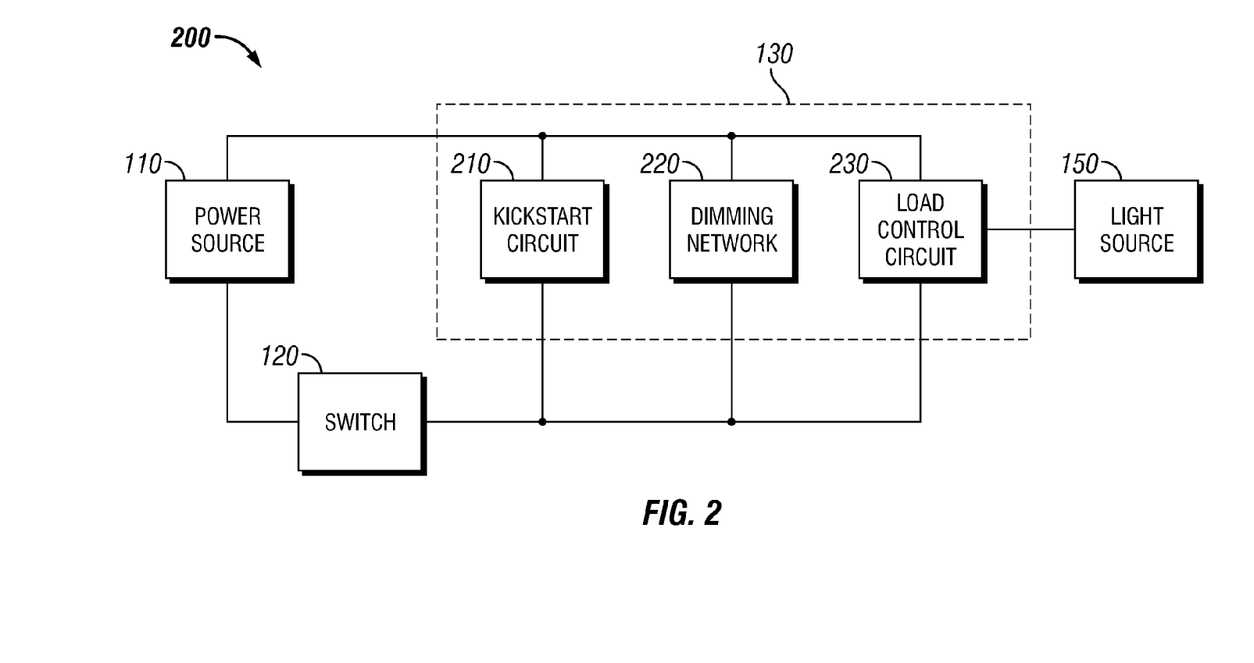
FIG. 2 illustrates a block diagram of a lighting system that has a dimmer circuit that includes a kickstart circuit, according to an exemplary embodiment of this disclosure.

Referring to FIG. 2, depicted is a block diagram of a lighting system 200 having an exemplary dimmer circuit 130, according to certain exemplary embodiments of this disclosure. Referring to FIGS. 1 and 2, the lighting system 200 is substantially similar to the lighting system 100 described above with respect to FIG. 1. In this case, the lighting system 200 includes various components of the dimmer circuit 130. Specifically, the dimmer circuit 130 of FIG. 2 includes a kickstart circuit 210, a dimming network 220, and a load control circuit 230. Each of these components is described below. Exemplary embodiments are not limited to the configuration shown in FIGS. 1 and 2 and discussed herein. The power source 110, the switch 120, and the light source 150 of FIG. 2 are substantially the same as the power source 110, the switch 120, and the light source 150 described above with respect to FIG. 1.

The kickstart circuit 210 of the dimmer circuit 130 is electrically coupled to the power source 110 and the switch 120. Further, the kickstart circuit 210 is placed electrically in parallel with the dimming network 220. The switch 120 is adjusted to a dimmer setting, which is communicated with the dimming network 220. When the power source 110 is activated (e.g., turned on), the power source 110 sends an initial power signal to the kickstart circuit 210, the dimming network 220, and the load control circuit 230. After a period of time (e.g., 250 msec), the initial power signal becomes a steady-state power signal.

When the dimmer circuit 130 does not include the kickstart circuit 210, the initial power signal, followed by the steady-state power signal, is fed to the dimming network 220. In certain cases, if the dimmer level of the switch 120 is too low, the resulting power (an initial signal followed by a steady-state signal) delivered by the dimming network 220 to the load control circuit 230 is not large enough to turn on the light source 150. In such a case, the load control circuit 230 can take several minutes or longer before the load control circuit 230 is turned on at a level that is sufficient to illuminate the light source 150.

When the dimmer circuit 130 does include the kickstart circuit 210, the initial power signal, followed by the steady-state power signal, is fed to both the kickstart circuit 210 and the dimming network 220. In certain exemplary embodiments, regardless of the dimmer setting of the switch 120, the initial power signal received by the kickstart circuit 210 generates a pulse signal that lasts substantially for the duration of the initial power signal before transitioning to the steady-state power signal.

The magnitude of the pulse signal generated by the kickstart circuit 210 is greater than the magnitude of the initial signal generated by the dimming network 220. As such, the pulse signal generated by the kickstart circuit 210 overrides the initial signal generated by the dimming network 220. The pulse signal is sent to the load control circuit 230, which quickly turns and sends the pulse signal to the light source 150. In certain exemplary embodiments, the magnitude of the pulse signal is great enough to turn on (illuminate) the load control circuit 230 during the period of time of the initial power signal. More detail about the kickstart circuit 210 is described below with respect to FIGS. 3 and 4.

The dimming network 220 is any type of dimmer that receives the initial power signal and the steady-state power signal from the power source 110. In addition, the dimming network 220 generates, based on the dimmer setting of the switch 120, the initial signal and the steady-state signal. Further, the dimming network 220 sends the initial signal and the steady-state signal to the load control circuit 230.

Figure 3:
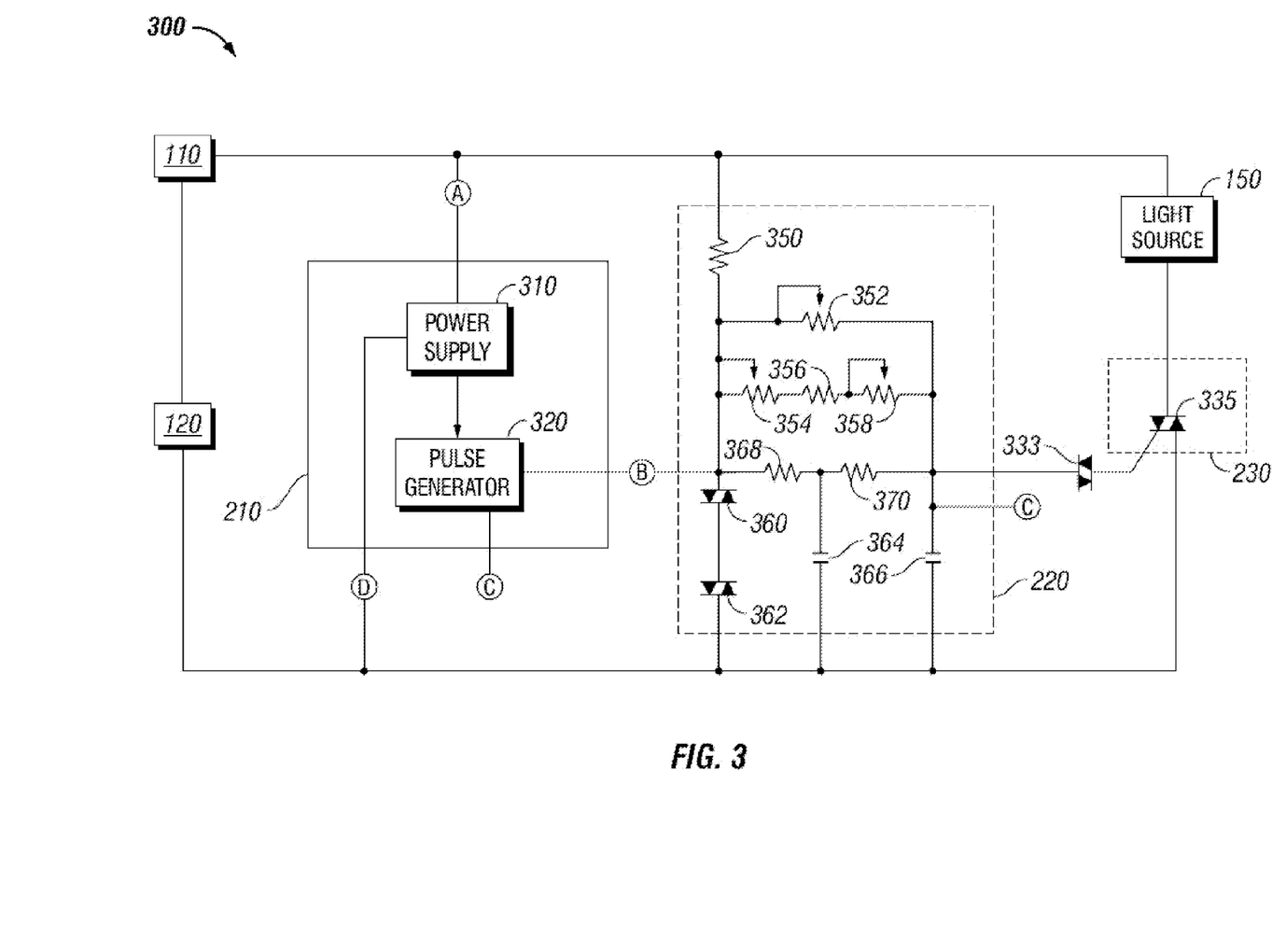
FIG. 3 illustrates a schematic block diagram of a dimmer circuit that includes a kickstart circuit, according to another exemplary embodiment of this disclosure.

The dimming network 220 can be a physical device, a circuit that includes one or more of a number of discrete components (e.g., resistor, diode, capacitor), an integrated circuit, software (as executed by a hardware processor, for example), or any suitable combination thereof. An example of a dimming network 220 is shown in FIG. 3.

The load control circuit 230 receives the pulse signal from the kickstart circuit 210. The load control circuit 230 receives the initial signal (in some cases) and the steady-state signal from the dimming network 220. If any of the signals received by the load control circuit 230 has a strong enough amplitude (e.g., if the magnitude of a signal is high enough to exceed a turn-on threshold voltage or current of the load control circuit 230), then the load control circuit 230 turns on or remains on.

The threshold voltage or current of the load control circuit 230 can, in addition or in the alternative, be equivalent to a steady-state threshold voltage or current level (higher than the turn-on threshold voltage or current) that allows the light source 150 to illuminate at a brightness that corresponds to the dimmer level set by the switch 120. In the case where both the turn-on threshold and the steady-state threshold exist for the load control circuit 230, when a signal is received where the magnitude of the signal is between the turn-on threshold and the steady-state threshold, then the load control circuit 230 can take some period of time (e.g., two minutes) to illuminate the light source 150 at a brightness that corresponds to the dimmer level set by the switch 120.

In certain exemplary embodiments, when the load control circuit 230 turns on, the load control circuit 230 remains on as long as a signal (e.g., current, voltage) with a magnitude greater than the turn-on threshold (or, in some cases, zero) continues to be received. When a signal falls below the turn-on threshold (or, in some cases, is terminated), the load control circuit 230 may revert to an off state. When the load control circuit 230 turns on or remains on, then the load control circuit 230 sends the signal it receives to the light source 150. As a result, the light of the light source 150 illuminates.

If the signal received by the light source 150 is low (e.g., a low voltage resulting from a low dimmer setting at the switch 120, which translates to the dimming network 220 generating a steady-state signal having a low amplitude), then the light of the light source 150 is only slightly illuminated. If the signal received by the light source 150 is high (e.g., a high voltage resulting from a pulse signal generated by the kickstart circuit 210), then the light of the light source 150 is illuminated brightly. If the signal received by the load control circuit 230 does not have a strong enough amplitude (e.g., if the magnitude of a voltage of the signal is too low), then the load control circuit 230 turns off or remains off. When the load control circuit 230 turns off or remains off, then the load control circuit 230 does not send the signal it receives to the light source 150.

The load control circuit 230 can be a physical device, a circuit that includes one or more of a number of discrete components (e.g., triac, resistor, diode, capacitor), an integrated circuit, software (as executed by a hardware processor, for example), or any suitable combination thereof. An example of a load control circuit 230 is shown in FIG. 3. In this case, the load control circuit 230 is a triac 335 (FIG. 3). In addition, or in the alternative, the load control circuit 230 can also include one or more other components. For example, the load control circuit 230 can include the triac 335 (FIG. 3) in parallel with a series-connected resistor and capacitor. In such a case, the series-connected resistor and capacitor form a snubber network that protects the triac 335 (FIG. 3) by suppressing transient voltages and/or currents.

Reverting to the dimming network and referring to FIGS. 1-3, the exemplary dimming network 220 shown in the system 300 of FIG. 3 is a resistor-capacitor (RC) phase controlled dimmer. The dimming network 220 includes a number of diacs (diac 360, diac 362), a number of capacitors (capacitor 364, capacitor 366), a number of variable resistors (resistor 352, resistor 354, resistor 358), and a number of fixed-value resistors (resistor 350, resistor 356, resistor 368, resistor 370). The value and/or arrangement of each of the components can vary.

The exemplary kickstart circuit 210 of FIG. 3 includes a power supply 310 and a pulse generator 320. The power supply 310 is operatively coupled to the power source 110, the switch 120, and the pulse generator 320. The pulse generator 320 is operatively coupled to the dimming network 220 and the load control circuit 230. The power supply 310 and a pulse generator 320 of the kickstart circuit 210 are described more fully below with respect to FIG. 4.

Figure 4:
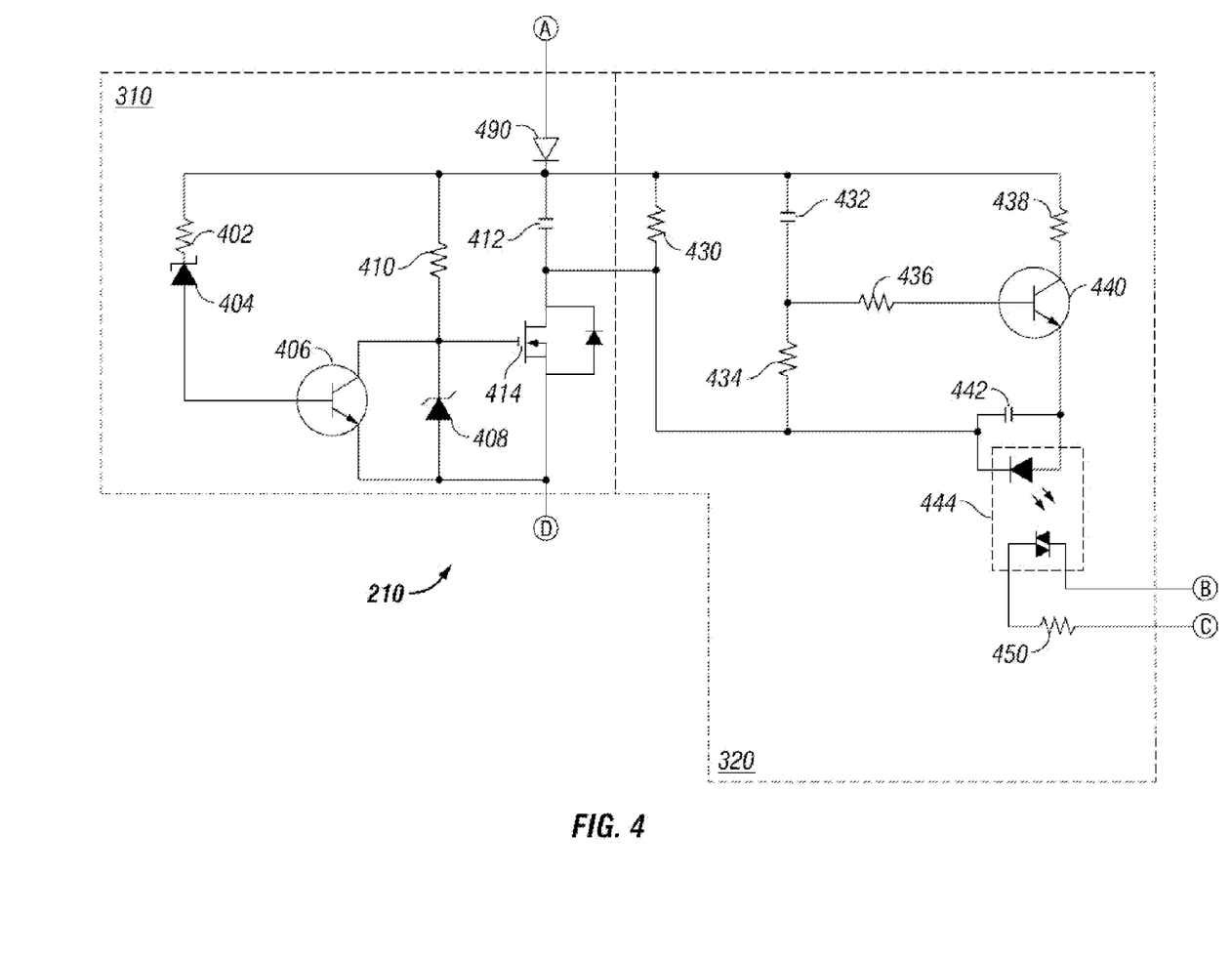
FIG. 4 illustrates a schematic diagram of an exemplary kickstart circuit that can be used with the dimmer circuit of FIG. 3, according to the teachings of this disclosure.

FIG. 4 illustrates a circuit diagram of an exemplary kickstart circuit 210 according to certain exemplary embodiments. Referring to FIGS. 1-4, the kickstart circuit 210 of FIG. 4 includes the power supply 310 and the pulse generator 320. In certain exemplary embodiments, the power supply 310 receives the initial power signal generated by the power source 110 and generates a processed signal using the initial power signal.

The power supply 310 of the kickstart circuit 210 can be a physical device, a circuit that includes one or more of a number of discrete components (e.g., resistor, diode, capacitor, transistor), an integrated circuit, software (as executed by a hardware processor, for example), or any suitable combination thereof. An example of a power supply 310 is shown in FIG. 4. In this case, the power supply 310 includes a general purpose diode 490, a capacitor 412, two zener diodes (zener diode 404 and zener diode 408), a transistor 406, two resistors (resistor 402 and resistor 410), and a metal-oxide semiconductor field effect transistor (MOSFET) 414.

The various components shown in the exemplary power supply 310 of FIG. 4 can have one or more of a number of values. For example, resistor 402 and resistor 410 can each be 100 kΩ, capacitor 412 can be 100 μF, diode 490 can be a general purpose low power diode rated for up to 1000V peak, zener diode 404 and zener diode 408 can each be 12V, transistor 406 can be a n-channel power transistor, and MOSFET 414 can be a 2.2 A, 250V, 2.000 Ohm, N-Channel Power MOSFET. In addition, or in the alternative, the power supply 310 can also include one or more other components having any of a number of values and arranged in one or more of a number of ways.

In certain exemplary embodiments, the capacitor 412 shown in FIG. 4 is sized so that it discharges quickly. In such a case, when the power supply 310 receives the initial power signal, the capacitor 412 quickly charges and discharges to provide the processed signal to the pulse generator 320. During steady state (e.g., when the power supply 310 receives the steady-state power signal from the power source 110), the capacitor 412 is fully charged, and so the capacitor 412 does not provide the processed signal to the pulse generator 320 during steady-state operation. When the steady-state power signal is cut off (e.g., when the power source 110 is turned off), the capacitor 412 discharges and remains discharged until another initial power signal is received by the power supply 310.

In certain exemplary embodiments, the pulse generator 320 receives the processed signal generated by the power supply 310 and generates, using the processed signal, a pulse signal. In addition, the pulse generator 320 sends the pulse signal to the load control circuit 230. The pulse generator 320 of the kickstart circuit 210 can be a physical device, a circuit that includes one or more of a number of discrete components (e.g., resistor, diode, capacitor, transistor), an integrated circuit, software (as executed by a hardware processor, for example), or any suitable combination thereof.

An example of a pulse generator 320 is shown in FIG. 4. In this case, the pulse generator 320 includes a two capacitors (capacitor 432 and capacitor 442), a transistor 440, five resistors (resistor 430, resistor 434, resistor 436, resistor 438, and resistor 450), and an optocoupler 444. The various components shown in the exemplary pulse generator 320 of FIG. 4 can have one or more of a number of values. For example, resistor 430 can be 10 kΩ, resistor 438 can be 1 kΩ, resistor 434 and resistor 436 can each be 100 kΩ, resistor 450 can be a variable resistor with a maximum value of 180 kΩ, capacitor 432 can be 4.7 g, capacitor 442 can be 0.1 µF, transistor 440 can be a n-channel power transistor, and the optocoupler can be a 6-Pin DIP Random-Phase Optoisolator with Triac Driver Output. In addition, or in the alternative, the pulse generator 320 can also include one or more other components having any of a number of values and arranged in one or more of a number of ways.

In certain exemplary embodiments, the resistor 450 has a variable resistance that can be adjusted by a user. Varying the resistance of the resistor 450 can adjust the amount of "flash" caused by the pulse signal in illuminating the light source 150. If the value of resistor 450 is reduced, then the light source 150 will not "flash" as brightly because the magnitude of the pulse signal is reduced. Likewise, if the value of resistor 450 is increased, then the light source 150 will "flash" brightly because the magnitude of the pulse signal is increased. In certain exemplary embodiments, if the value of resistor 450 is reduced enough, the magnitude of the pulse signal will be too low to kickstart the light source 150. In other words, in such a case, the magnitude of the pulse signal will be less than a threshold value to quickly turn on the light source 150. Rather than having a variable resistance, the resistor 450 can have a fixed resistance value.

The value of resistor 430 can determine, at least in part, how quickly capacitor 412 of the power source 310 discharges. In certain exemplary embodiments, the resistance of resistor 430 is low (e.g., 10 kΩ). In addition, the combination of capacitor 432 and resistor 436 can determine, at least in part, how long the pulse signal lasts. Specifically, in the exemplary circuit shown in FIG. 4, the combination of capacitor 432 and resistor 436 determine how long transistor 440 is on. When transistor 440 is on, the optocoupler 444 of the pulse generator 320 generates the pulse signal. When transistor 440 is off, the pulse signal generated by the optocoupler 444 of the pulse generator 320 is terminated.

In certain exemplary embodiments, the optocoupler 444 of the pulse generator 320 sends the pulse signal directly to the load control circuit 230. Alternatively, or in addition, the optocoupler 444 of the pulse generator 320 sends the pulse signal to a diac 333 and/or some other electrical component.

Referring to the components of the exemplary power supply 310 and the exemplary pulse generator 320 of the kickstart circuit 210 of FIG. 4, the anode of the diode 490 is electrically coupled to the power source 110. The cathode of the diode 490 is electrically coupled to a first end of resistor 402, a first end of resistor 410, a first end of capacitor 412, a first end of resistor 430, a first end of capacitor 432, and a first end of resistor 438. The second end of resistor 402 is electrically coupled to the cathode of zener diode 404. The anode of zener diode 404 is electrically coupled to the base of transistor 406. The second end of resistor 410 is electrically coupled to the cathode of zener diode 408, the collector of transistor 406, and the gate of MOSFET 414. The emitter of transistor 406, the anode of zener diode 408, and the source of MOSFET 414 are electrically coupled to the output of the switch 120.

The second side of capacitor 412 is electrically coupled to the drain of MOSFET 414, the second end of resistor 430, a first end of resistor 434, a first end of capacitor 442, and the cathode of the input diode for the optocoupler 444. The second end of resistor 438 is electrically coupled to the collector of transistor 440. The second end of resistor 436 is electrically coupled to the base of transistor 440. The first end of resistor 436 is electrically coupled to the second end of resistor 434 and the second end of capacitor 432. The second end of capacitor 442 is electrically coupled to the emitter of transistor 440 and the anode of the input diode for the optocoupler 444. The main terminal 1 of the triac of the optocoupler 444 is electrically coupled to the first end of resistor 450. The second end of resistor 450 is electrically coupled to, at least, a first end of diac 333. The main terminal 2 of the triac of the optocoupler 444 is electrically coupled to, at least, a first end of diac 360 of the dimmer circuit 220.

Figure 5:
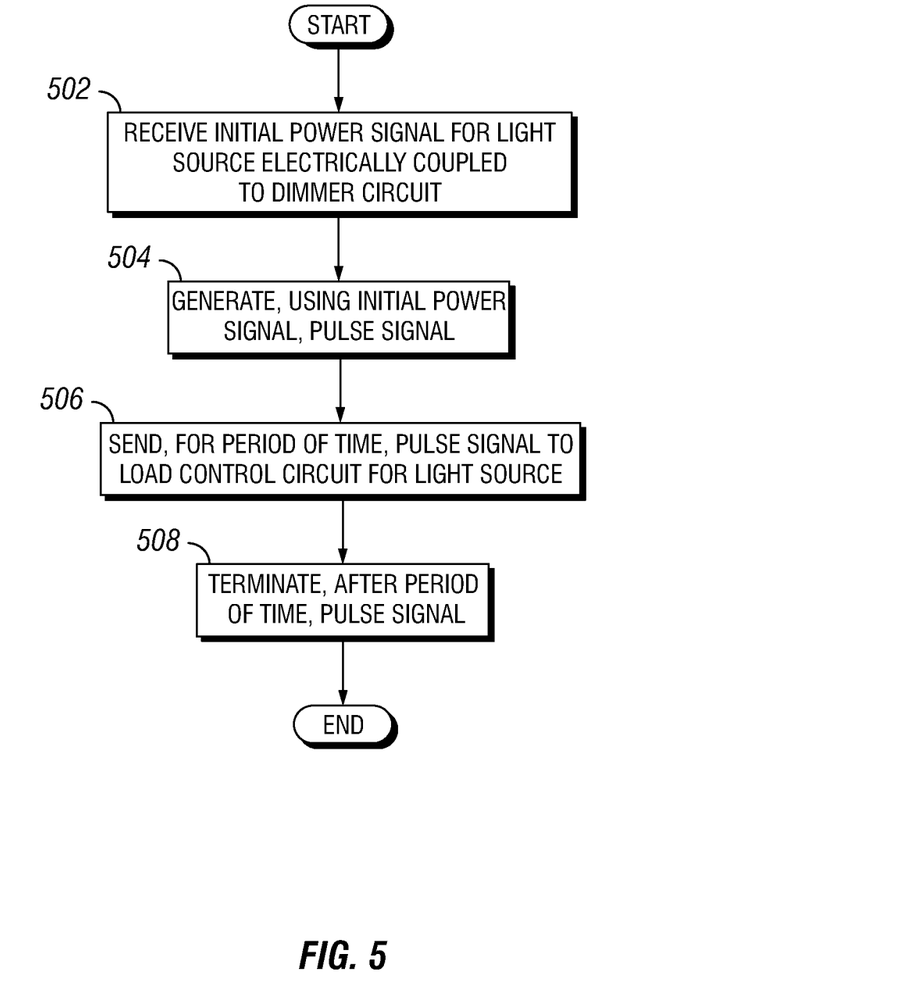
FIG. 5 shows a flowchart of a method for controlling a lighting device in accordance with one or more exemplary embodiments.

FIG. 5 is a flowchart of a method 500 for providing a kickstart pulse to a dimmer circuit in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order.

In addition, a person of ordinary skill in the art will appreciate that additional steps not shown in FIG. 5, may be included in performing this method. Accordingly, the specific arrangement of steps should not be construed as limiting the scope. In addition, a particular computing device, as described, for example, in FIG. 6 below, may be used to perform one or more of the steps for the method 500 described below.

Now referring to FIGS. 1-5, the exemplary method 500 begins at the START step and proceeds to step 502, where an initial power signal is received. In certain exemplary embodiments, the initial power signal is received from the power source 110 by the power supply 310 of a kickstart circuit 210. In such a case the kickstart circuit 210 can be electrically coupled in parallel with a dimmer network 220, where the kickstart circuit 210 and the dimmer network 220 are part of a dimmer circuit 130. In other words, the dimmer network 220 can simultaneously receive the initial power signal from the power source 110. The dimmer network 220 also receives a dimmer setting from the switch 120. In certain exemplary embodiments, the dimmer setting of the switch 120 is not received by the kickstart circuit 210.

In step 504, a pulse signal is generated. In certain exemplary embodiments, the pulse signal is generated by the kickstart circuit 210 using the initial power signal. The kickstart circuit 210 can generate the pulse signal in one or more of a number of ways. For example, the pulse signal can be generated by activating, using the initial power signal, a power supply 310 of the kickstart circuit 210. After the power supply 310 is activated, the power supply 310 can use the initial power signal to generate a processed signal. The power supply 310 can then send the processed signal to the pulse generator 320 of the kickstart circuit 210. Upon receiving the processed signal, the pulse generator 320 initiates and generates the pulse signal.

The pulse signal has a magnitude that can be determined based on one or more components of the kickstart circuit 210. For example, a resistance value of a resistor 450 in the pulse generator 320 can determine the magnitude of the pulse signal. The resistor 450 can be a fixed value resistor or a variable resistor. If the resistor 450 is a variable resistor, a user can change the value of the resistor 450 to correspondingly adjust the magnitude of the pulse signal.

When the kickstart circuit 210 is electrically coupled in parallel with the dimmer network 220, the dimmer network 220 receives the initial power signal from the power source 110 and a dimmer setting from the switch 120. Based on the initial power signal and the dimmer setting, the dimmer network 220 generates an initial signal. The initial signal generated by the dimmer network 220 also has a magnitude. In certain exemplary embodiments, the magnitude of the initial signal generated by the dimmer network 220 is less than the magnitude of the pulse signal generated by the pulse generator 320. For example, if the dimmer setting is less than 100% (i.e., if the dimmer setting is for less than full power to the dimmer network 220 so that the light source 150 is dimmed to some extent), the magnitude of the initial signal generated by the dimmer network 220 can be less than the magnitude of the pulse signal generated by the pulse generator 320.

In step 506, the pulse signal is sent to a light source 150. In such a case, the pulse signal is sent to the light source 150 by the pulse generator 320. More specifically, in certain exemplary embodiments, the pulse signal is sent by the pulse generator 320 to a load control circuit 230, which is activated by the pulse signal (when the magnitude of the pulse signal is higher than the turn-on threshold of the load control circuit 230) and sends the pulse signal to the light source 150. In such a case, if the magnitude of the pulse signal is not high enough (below a turn-on threshold for the load control circuit 230), then the load control circuit 230 does not turn on, and the pulse signal is not sent to the light source 150. When the load control circuit 230 is turned on, the load control circuit 230 sends any signal (e.g., pulse signal, initial signal) it receives to the light source 150.

The pulse signal is sent to the light source 150 for a period of time. Typically, the period of time is less than 20 cycles (e.g., 200 msec, 250 msec), but can be longer. The period of time can be based on settings and/or components within the pulse generator 320. Such settings and/or components (e.g., the resistance of a resistor) can be fixed or adjustable, as by a user.

In certain exemplary embodiments, when the kickstart circuit 210 is electrically coupled in parallel with the dimmer network 220, the dimmer network 220 sends the initial signal to the light source 150. If the dimmer setting of the switch 120 is low (instructing the light source 150 to have a low illumination level), then the initial signal is too low to turn on the load control circuit 230 in the period of time. In certain exemplary embodiments, the load control circuit 230 receives the pulse signal from the pulse generator 320 and the initial signal from the dimmer circuit 220 at substantially the same time. Alternatively, the dimmer circuit 220 may be prohibited from sending the initial signal (or the initial signal may be blocked) to the load control circuit 230 when the pulse signal is being sent by the pulse generator 320 to the load control circuit 230. In yet another exemplary embodiment, the dimmer circuit 220 may be prohibited from sending the initial signal (or the initial signal may be blocked) to the load control circuit 230 for a certain amount of time (e.g., the period of time) after receiving the initial power signal from the power source 110.

In step 508, the pulse signal is terminated. In certain exemplary embodiments, the pulse signal is terminated after the period of time. Alternatively, or in addition, the pulse signal can be terminated based on one or more of a number of other factors, including but not limited to the illumination level of the light source 150, the magnitude of the initial signal, and the magnitude of the steady-state signal. The pulse signal can be terminated by the pulse generator 320 and/or the power supply 310 of the kickstart circuit 210.

In certain exemplary embodiments, when the pulse generator 320 terminates the pulse signal, the power supply 310 stops generating the processed signal for the pulse generator 320 after the period of time has expired, even though the power supply 310 may continue to receive the initial power signal and/or the steady-state power signal from the power source 110. Alternatively, the pulse generator 320 receives the processed signal from the power supply 310 but stops generating the pulse signal after the period of time has expired.

When the pulse signal is terminated by the kickstart circuit 210, a signal (e.g., the initial signal, the steady-state signal) generated by the dimmer network 220 can be sent to and be used to control the load control circuit 230.

When the pulse signal is terminated by the pulse generator 320, the transition from the pulse signal to the steady-state signal can occur in one or more of a number of ways. For example, the pulse signal can be terminated immediately, so that the steady-state signal instantaneously and seamlessly replaces the pulse signal within a single cycle when the pulse signal is terminated. As another example, the pulse signal can be gradually (e.g., as a step function, according to some straight line decrease) when the pulse signal is terminated. In other words, the pulse signal can take multiple cycles during its termination.

When the power source 110 sends a steady-state power signal (which can be when the period of time is expired) to the kickstart circuit 210 and the dimmer circuit 220, the dimmer circuit 220 generates a steady-state signal. Because the load control circuit 230 is already on, the steady-state signal can have a magnitude that is less than the magnitude of the pulse signal but greater than the turn-on threshold for the load control circuit 230. In such a case, the load control circuit 230 can send the steady-state signal to the light source 150 to illuminate the light source 150.

Figure 6:
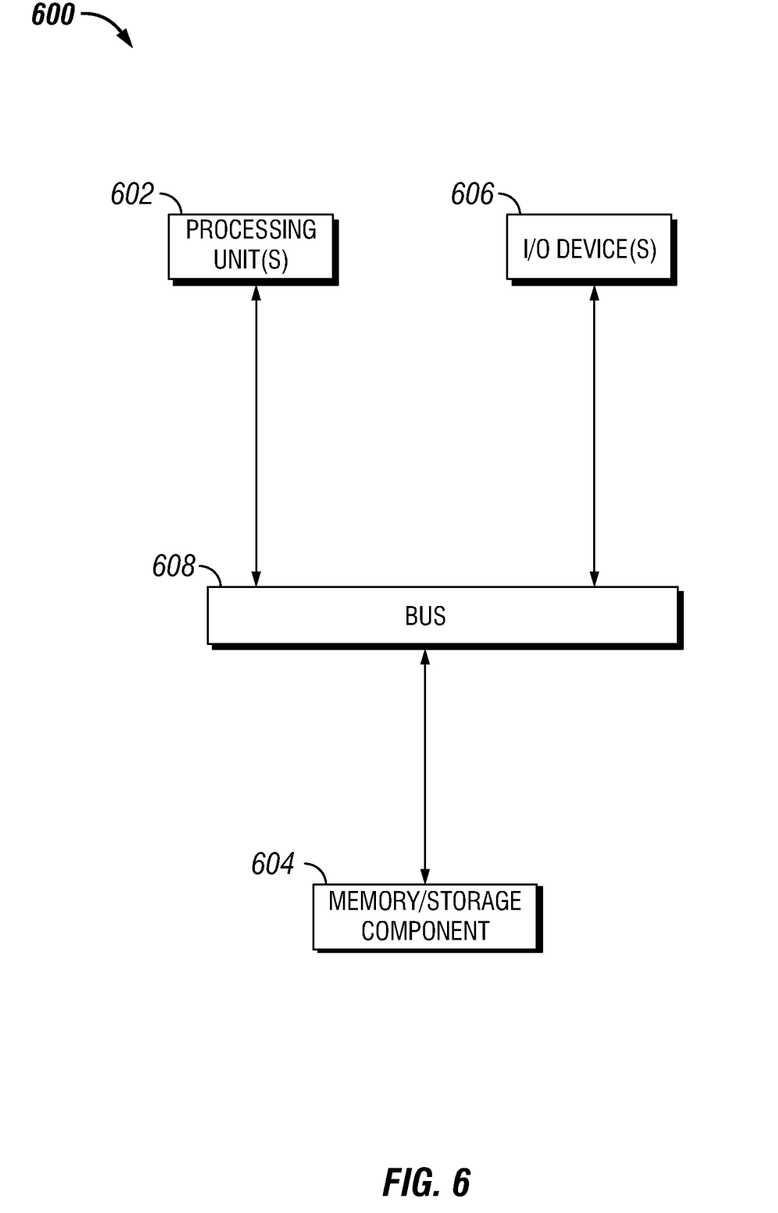
FIG. 6 shows a computer system in accordance with one or more exemplary embodiments.

FIG. 6 illustrates one embodiment of a computing device 600 capable of implementing one or more of the various techniques described herein, and which may be representative, in whole or in part, of the elements described herein. Computing device 600 is only one example of a computing device and is not intended to suggest any limitation as to scope of use or functionality of the computing device and/or its possible architectures. Neither should computing device 600 be interpreted as having any dependency or requirement relating to any one or combination of components illustrated in the example computing device 600. As shown in FIG. 6, the bus 608 is operatively coupled to each of the processing unit(s) 602, the I/O device(s) 606, and the memory/storage component 604.

Computing device 600 includes one or more processors or processing units 602, one or more memory/storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Memory/storage component 604 may include volatile media (such as random access memory (RAM)) and/or nonvolatile media (such as read only memory (ROM), flash memory, optical disks, magnetic disks, and so forth). Memory/storage component 604 can include fixed media (e.g., RAM, ROM, a fixed hard drive, etc.) as well as removable media (e.g., a Flash memory drive, a removable hard drive, an optical disk, and so forth).

One or more I/O devices 606 allow a customer, utility, or other user to enter commands and information to computing device 600, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 600 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 600 includes at least the minimal processing, input, and/or output means necessary to practice one or more embodiments.

Further, those skilled in the art will appreciate that one or more elements of the aforementioned computer device 600 may be located at a remote location and connected to the other elements over a network. Further, one or more exemplary embodiments may be implemented on a distributed system having a plurality of nodes, where each portion of the implementation (e.g., pulse generator 320, power source 310) may be located on a different node within the distributed system. In one or more embodiments, the node corresponds to a computer system. Alternatively, the node may correspond to a processor with associated physical memory. The node may alternatively correspond to a processor with shared memory and/or resources.

The following description (in conjunction with FIGS. 1 through 6) describes an example in accordance with one or more exemplary embodiments. The example is for explanatory purposes only and is not intended to limit the scope. Terminology used in FIGS. 1-6 may be used in the example without further reference to those figures.

EXAMPLE

Figure 7:
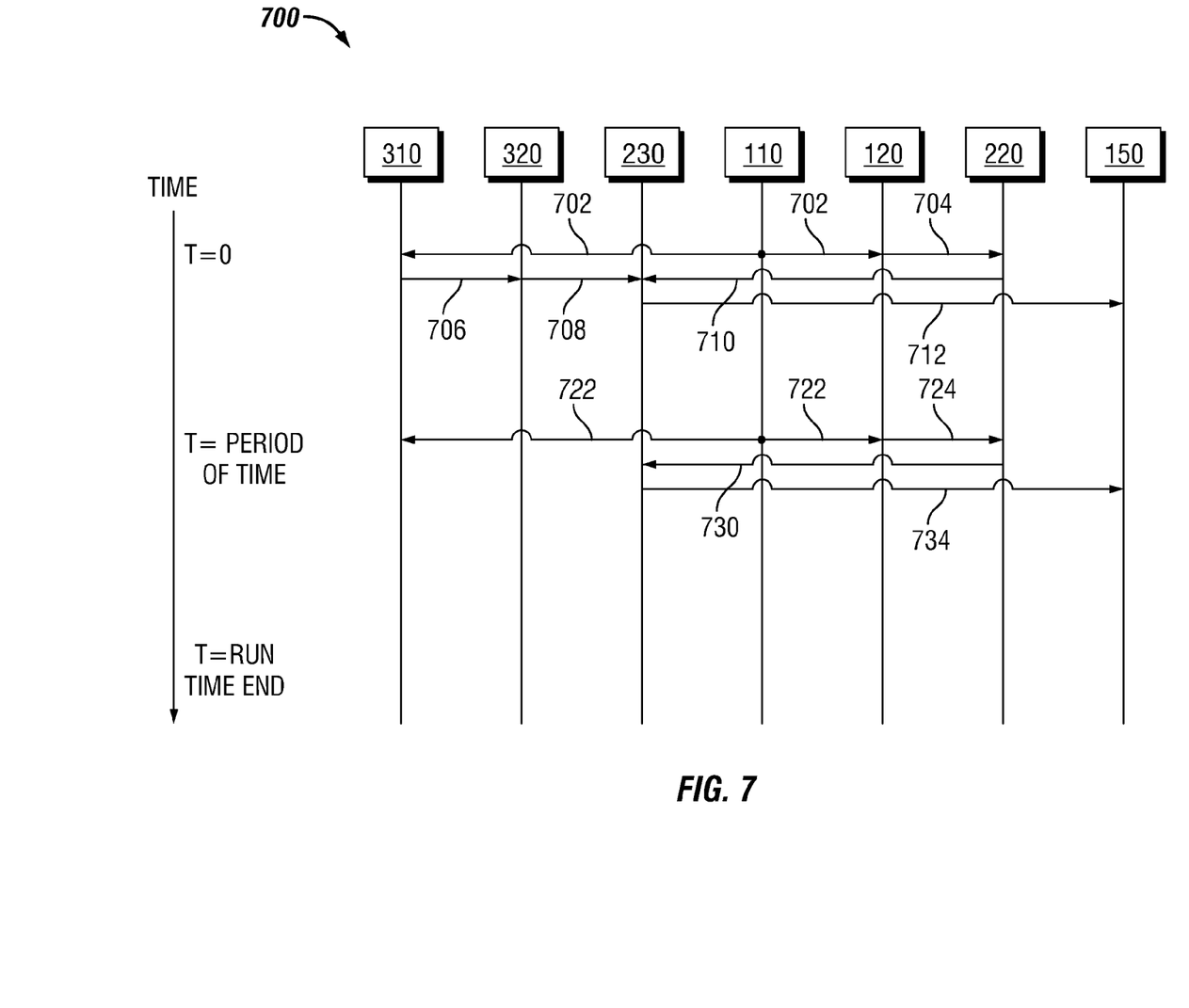
FIG. 7 shows an example of kickstarting a dimmer circuit using certain exemplary embodiments.

Referring to FIGS. 1-7, consider the following example for providing a kickstart pulse to a dimmer circuit using an exemplary power supply 310 and pulse generator 320, as described above. As shown in FIG. 7, at time t=0, the power source 110 initiates an initial power signal 702. Prior to time t=0, the light source 150 is off (not illuminated). The initial power signal 702 is sent to both the power supply 310 of the kickstart circuit 210 and the switch 120 at substantially the same time.

When the power supply 310 receives the initial power signal 702 from the power source 110, the power supply 310 uses the initial power signal 702 to generate the processed signal 706. The power supply 310 then sends the processed signal 706 to the pulse generator 320, where the pulse generator 320 generates a pulse signal 708. The pulse generator 320 then sends the pulse signal 708 to the load control circuit 230. This process occurs almost instantaneously (e.g., a few cycles).

At substantially the same time, when the switch 120 receives the initial power signal 702 from the power source 110, the switch 120 sends a modified initial power signal 704 to the dimmer network 220, where the modified initial power signal 704 includes the dimmer setting of the switch 120. Subsequently, the dimmer network 220 generates an initial signal 710 using the modified initial power signal 704 and sends the initial signal 710 to the load control circuit 230. This process also occurs almost instantaneously (e.g., a few cycles).

When the load control circuit 230, receives the pulse signal 708 from the pulse generator 320 and the initial signal 710 from the dimmer circuit 220, the magnitude of the initial signal 710 is below the turn-on threshold for the load control circuit 230. As a result, the load control circuit 230 ignores the initial signal 710. On the other hand, the magnitude of the pulse signal 708 is above the turn-on threshold for the load control circuit 230. As a result, the load control circuit 230 turns on, using the pulse signal 708, and sends an initial illumination signal 712 to the light source 150. Consequently, the light source 150 illuminates upon receiving the initial illumination signal 712, where the initial illumination signal 712 is proportionate to the pulse signal 708. In this example, the magnitude of the pulse signal 708 is high enough to illuminate the light source 150 at substantially 100% of the illuminating capacity (e.g., 60 W, 15 W, 3 W) of the light source 150.

Between time t=0 and time t=period of time, the power source 110 continuously sends the initial power signal 702 to both the power supply 310 of the kickstart circuit 210 and the switch 120. After a period of time (at time t=period of time in FIG. 7, which may be, for example, 200 msec or 250 msec), the power source 110 transitions the initial power signal 702 to a steady-state power signal 722. Between time t=period of time and t=run time end, the steady-state power signal 722 is sent continuously to both the power supply 310 of the kickstart circuit 210 and the switch 120.

When the power supply 310 receives the steady-state power signal 722 from the power source 110, the power supply 310 stops generating the processed signal 706. As a result, the pulse generator 320 is unable to generate the pulse signal 708. Consequently, the load control circuit 230 receives no input from the pulse generator 320.

At substantially the same time, when the switch 120 receives the steady-state power signal 722 from the power source 110, the switch 120 sends a modified steady-state power signal 724 to the dimmer network 220, where the modified steady-state power signal 724 includes the dimmer setting of the switch 120. Subsequently, the dimmer network 220 generates a steady-state signal 730 using the modified steady-state power signal 724 and sends the steady-state signal 730 to the load control circuit 230. This process also occurs almost instantaneously (e.g., a few cycles).

When the load control circuit 230 receives the steady-state signal 730 from the dimmer circuit 220, the magnitude of the steady-state signal 730 is above the turn-on threshold for the load control circuit 230. As a result, the load control circuit 230 remains on, using the steady-state signal 730, and sends a steady-state illumination signal 734 to the light source 150. Consequently, the light source 150 illuminates upon receiving the steady-state illumination signal 734, where the steady-state illumination signal 734 is proportionate to the steady-state signal 730. In this example, the magnitude of the steady-state signal 730 is at a dimmed level so that the light source 150 is illuminated at approximately 25% of the illuminating capacity of the light source 150.

At time t=run time end and beyond, the light source 110 is off. As a result, no signals are sent to the power supply 310 and the dimmer network 220 (through the switch 120), and so the load control circuit 230 turns off. Consequently, the light source 150 is no longer illuminated.

Using certain exemplary embodiments described herein allows a light source operating through a dimmer circuit to illuminate substantially instantly when power is delivered to the circuit, even if the dimmer setting of the dimmer switch is set at a very low level. To accomplish this, a kickstart circuit is inserted into an existing dimmer circuit and operates in parallel with such dimmer circuit. The exemplary kickstart circuit delivers a pulse that typically lasts a fraction of a second and allows the load control circuit of the dimmer circuit to turn on and remain on when the pulse stops and the signal (having a lower magnitude than the magnitude of the pulse) delivered by the dimmer network is received.

In addition, using certain exemplary embodiments, the duration of the kickstart and/or the magnitude of the kickstart can be adjusted. For example, a user can rotate a dial to control the magnitude of the kickstart, which consequently adjusts the amount of "apparent light" that flashes while the exemplary kickstart circuit is enabled. The exemplary kickstart circuit can be used with any type of light source and/or any type of dimmer circuit.

Although specific example embodiments have been described above in detail, the description is merely for purposes of illustration. It should be appreciated, therefore, that the exemplary embodiments described above are provided by way of example only and are not intended as required or essential elements of unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the present disclosure defined in the following claims, the scope of which is to be accorded the broadest interpretation so as to encompass such modifications and equivalent structures.

We claim:

1. A method for providing a kickstart pulse to a load control circuit, the method comprising:
   receiving, for a period of time, an initial power signal for a light source from a power source, wherein the power source is also electrically coupled in parallel to a dimmer circuit;
   generating, using the initial power signal, a pulse signal; and
   sending, for the period of time, the pulse signal to a load control circuit for the light source,
   wherein the light source is illuminated by the load control circuit using the pulse signal for the period of time,
   wherein the pulse signal has a first magnitude,
   wherein the first magnitude of the pulse signal is greater than a second magnitude of an input signal generated by the dimmer circuit for the load control circuit during the period of time.

2. The method of claim 1, further comprising:
   terminating, after the period of time, the pulse signal,
   wherein the steady-state signal generated by the dimmer circuit is used by the load control circuit to illuminate the light source after the period of time.

3. The method of claim 2, wherein generating the pulse signal comprises:
   activating, using the initial power signal, a power supply;
   generating, by the power supply using the initial power signal, a processed signal;
   sending the processed signal to a pulse generator; and
   initiating the pulse generator using the processed signal generated by the power supply.

4. The method of claim 3, wherein, after the period of time, the power supply stops generating the processed signal to terminate the pulse signal.

5. The method of claim 1, further comprising:
   adjusting, using a variable resistor, the first magnitude of the pulse signal.

6. The method of claim 1, wherein the period of time is less than 20 cycles.

7. The method of claim 6, wherein the load control circuit generates a steady-state illumination signal after the period of time, wherein the steady-state signal illumination has a third magnitude that is based on a dimmer setting of the dimmer circuit.

8. The method of claim 1, wherein the pulse signal is generated using a hardware processor.

9. A kickstart circuit for a light source with a dimmer, comprising:
   a power supply comprising a plurality of first components that receives an initial power signal from a power source and generates, using the initial power signal, a processed signal; and
   a pulse generator electrically coupled to the power supply, wherein the pulse generator comprises a plurality of second components configured to:
   receive the processed signal;
   generate, using the processed signal, a pulse signal; and
   send the pulse signal to a load control circuit for the light source,
   wherein the load control circuit receives an input signal generated by the dimmer electrically, wherein the dimmer generates the input signal based on the initial power signal generated by the power source,
   wherein the pulse has a first magnitude that is greater than a second magnitude of the input signal,
   wherein the input signal is ignored by the load control circuit when the load control circuit receives the pulse signal.

10. The kickstart circuit of claim 9, wherein the plurality of second components comprises an optocoupler that generates the pulse signal to the load control circuit.

11. The kickstart circuit of claim 10, wherein the plurality of second components further comprises a resistor, electrically coupled to an output of the optocoupler, which determines a magnitude of the pulse signal sent to the load control circuit.

12. The kickstart circuit of claim 11, wherein the plurality of second components further comprises a diode for alternating current that is electrically coupled to the resistor.

13. The kickstart circuit of claim 11, wherein the resistor has a fixed resistance value.

14. The kickstart circuit of claim 11, wherein the resistor is a variable resistor within a range of resistance values, wherein the variable resistor can be adjusted by a user.

15. The kickstart circuit of claim 9, wherein the load control circuit comprises a triac.

16. The kickstart circuit of claim 9, wherein the power supply is a switched-mode power supply.

17. A dimmer circuit, comprising:
- a dimming network that receives an initial power signal during a period of time and a steady-state power signal after the period of time from a power source, wherein the dimming network generates, using the initial power signal, an input signal during the period of time, and wherein the dimming network generates, using the steady-state power signal, a steady-state signal after the period of time;
- a load control circuit that is electrically coupled to an output of the dimming network and to a light source; and
- a kickstart circuit electrically coupled to the load control circuit, wherein the kickstart circuit provides a pulse signal for the period of time to the load control circuit,
- wherein the pulse signal has a first magnitude that is greater than a second magnitude of the input signal,
- wherein the load control circuit uses the pulse signal generated by the kickstart circuit to illuminate the light source during the period of time,
- wherein the load control circuit uses the steady-state signal generated by the dimming network to illuminate the light source after the period of time, and
- wherein the kickstart circuit and the dimming network are electrically coupled in parallel between the power source and the load control circuit.

18. The dimmer circuit of claim 17, wherein the kickstart circuit is electrically coupled in parallel with the dimming network between the power source and the load control circuit.

19. The dimmer circuit of claim 17, wherein the pulse signal illuminates the light source more brightly than the steady-state signal.

20. A non-transitory computer readable medium comprising computer readable program code embodied therein for performing a method for controlling a lighting device, the method comprising:
- receiving, for a period of time, an initial power signal for a light source from a power source, wherein the power source is also electrically coupled in parallel to a dimmer circuit;
- generating, using the initial power signal, a pulse signal; and
- sending, for the period of time, the pulse signal to a load control circuit for the light source,
- wherein the light source is illuminated by the load control circuit using the pulse signal for the period of time,
- wherein the pulse signal has a first magnitude,
- wherein the first magnitude of the pulse signal is greater than a second magnitude of an input signal generated by the dimmer circuit for the load control circuit during the period of time.

* * * * *